US010682929B2

(12) United States Patent
Costantino

(10) Patent No.: US 10,682,929 B2
(45) Date of Patent: Jun. 16, 2020

(54) ADJUSTMENT DEVICE FOR ADJUSTING THE INCLINATION OF THE BACKREST OF A SEAT OF A VEHICLE

(71) Applicant: MARTUR SUNGER VE KOLTUK TESISLERI TICARET VE SANAYI A.S., Istanbul (TR)

(72) Inventor: Gianfranco Costantino, Turin (IT)

(73) Assignee: MARTUR SUNGER VE KOLTUK TESISLERI TICARET VE SANAYI A.S., Istanbul (TR)

( * ) Notice: Subject to any disclaimer, the term of this patent is extended or adjusted under 35 U.S.C. 154(b) by 165 days.

(21) Appl. No.: 16/070,336

(22) PCT Filed: Sep. 8, 2017

(86) PCT No.: PCT/IB2017/055429
§ 371 (c)(1),
(2) Date: Jul. 16, 2018

(87) PCT Pub. No.: WO2019/048911
PCT Pub. Date: Mar. 14, 2019

(65) Prior Publication Data
US 2020/0114786 A1    Apr. 16, 2020

(51) Int. Cl.
*B60N 2/22*    (2006.01)
(52) U.S. Cl.
CPC ......... *B60N 2/2236* (2013.01); *B60N 2/2227* (2013.01)
(58) Field of Classification Search
CPC .. B60N 2/2236; B60N 2/2227; B60N 2/2218; B60N 2/22
See application file for complete search history.

(56) References Cited

U.S. PATENT DOCUMENTS 4,291,914 A * 9/1981 Mizelle ............... B60N 2/2236
16/348
4,408,799 A * 10/1983 Bowman ............. B60N 2/2227
16/242
(Continued)

FOREIGN PATENT DOCUMENTS

FR    2900105 A1    10/2007
GB    2343839 A  *  5/2000  ........... B60N 2/2236

OTHER PUBLICATIONS

International Search Report issued for PCT/IB2017/055429 dated May 15, 2018.
(Continued)

*Primary Examiner* — David R Dunn
*Assistant Examiner* — Tania Abraham
(74) *Attorney, Agent, or Firm* — Howson & Howson LLP

(57) ABSTRACT

The present invention relates to an adjustment device for adjusting the inclination of the backrest (14) of a seat (10) of a vehicle, which allows to perform both quick adjustments of large angular amplitude and fine adjustments. According to a possible embodiment of the invention, the adjustment device comprises separate control elements (20, 22) for performing quick adjustments and fine adjustments, respectively, of the inclination of the backrest (14). According to another possible embodiment of the invention, the adjustment device comprises a single control element (20) for performing both quick adjustments and fine adjustments of the inclination of the backrest (14).

6 Claims, 6 Drawing Sheets

(56) References Cited

U.S. PATENT DOCUMENTS

| | | | | |
|---|---|---|---|---|
| 6,568,759 B1* | 5/2003 | Hochmuth | ............ | B60N 2/2257 |
| | | | | 297/367 R |
| 8,146,994 B2* | 4/2012 | Doxey | ..................... | B60N 2/68 |
| | | | | 297/354.12 |
| 8,550,559 B2* | 10/2013 | Sollars | ................. | B60N 2/2236 |
| | | | | 297/362.11 |
| 9,145,072 B2* | 9/2015 | Sollars | ................. | B60N 2/2236 |
| 2007/0170764 A1 | 7/2007 | Thiel et al. | | |
| 2007/0182228 A1 | 8/2007 | Elio et al. | | |

OTHER PUBLICATIONS

Written Opinion of the International Search Authority issued for PCT/IB2017/055429 dated May 15, 2018.

\* cited by examiner

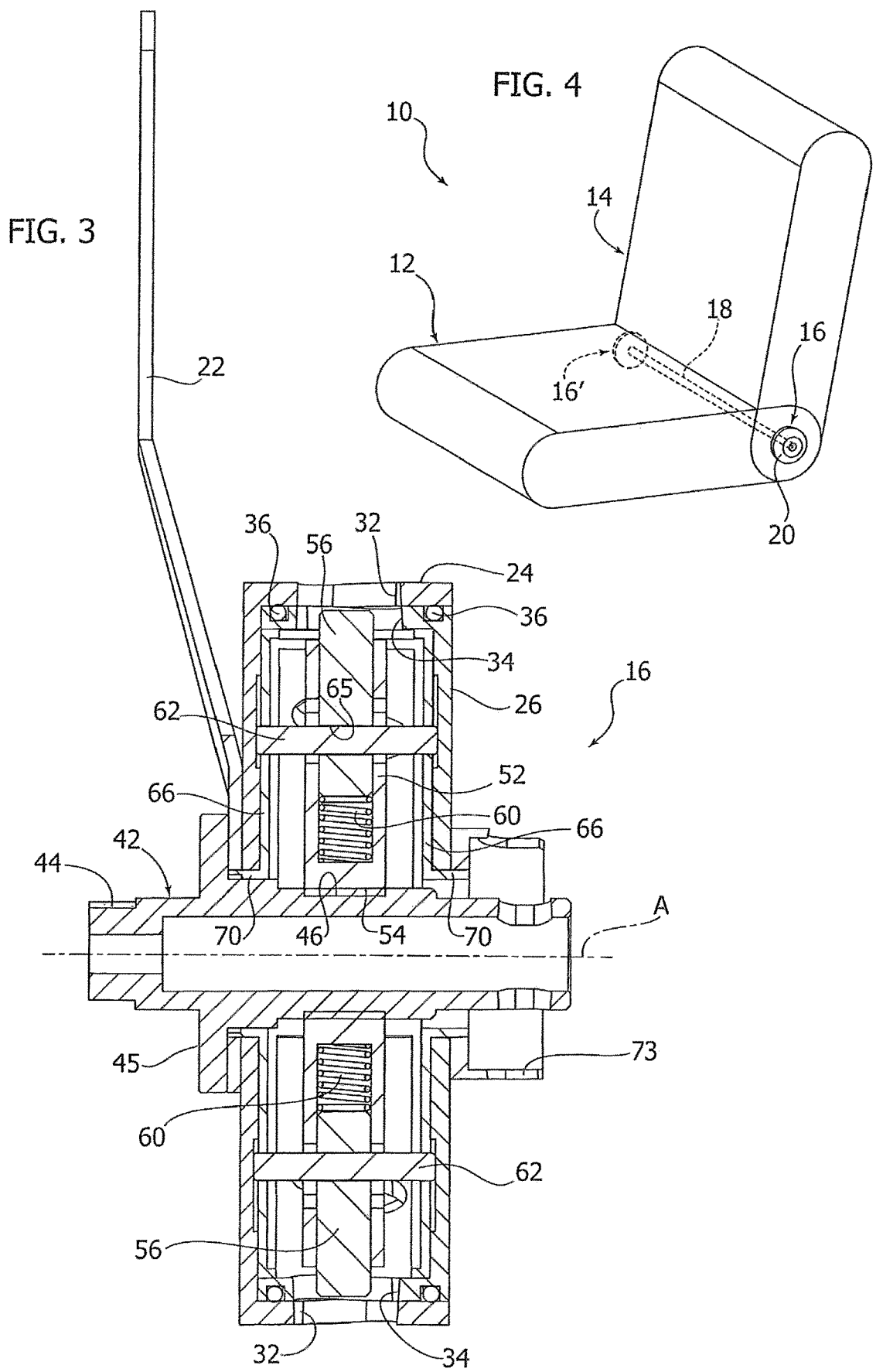

ADJUSTMENT DEVICE FOR ADJUSTING THE INCLINATION OF THE BACKREST OF A SEAT OF A VEHICLE

FIELD OF THE INVENTION

The present invention relates to an adjustment device for adjusting the angle of the backrest of a seat of a vehicle.

BACKGROUND ART

In the state of the art there are two types of non-electrical devices for adjusting the inclination of the backrest of a vehicle seat. The devices of the first category include a rotary knob that can be manually operated by the user. The devices of this type allow a fine regulation of the inclination angle of the backrest, but they are inconvenient in case the backrest has to be moved by a large angle. In fact, in these cases it is necessary to rotate the adjustment knob for a long time and this maneuver is particularly inconvenient in case the backrest must be rotated by particularly large angles, for example in case the user wishes to completely overturn the backrest backwards.

A second category of adjustment devices provides a release lever which, when it is actuated by the user, unlocks the seat with respect to the backrest and allows the user to select the desired angle of inclination. When the release lever is released, the backrest is locked in the selected position. The devices of this second category allow to quickly make adjustments of any magnitude. However, devices of this type generally do not allow fine adjustments to the backrest angle of inclination.

SUMMARY OF THE INVENTION

The aim of the present invention is to provide a device for adjusting the inclination of the backrest of a seat which overcomes the drawbacks of the known solutions.

A particular object of the present invention is to provide an adjustment device that allows to perform both quick adjustments of large angular amplitude and fine adjustments.

According to the present invention, this aim is achieved by a device having the features given in claim 1.

Preferred embodiments of the invention are provided in the dependent claims.

The claims form an integral part of the teaching given in relation to the invention.

BRIEF DESCRIPTION OF THE DRAWINGS

The present invention will now be described in detail with reference to the accompanying drawings, only as non-limiting examples, in which:

FIG. 3 is an axial section of the adjustment device of FIG. 1, FIG. 4 is a schematic perspective view illustrating a vehicle seat provided with an adjustment device according to a second embodiment of the present invention.

DETAILED DESCRIPTION

Figure 1:
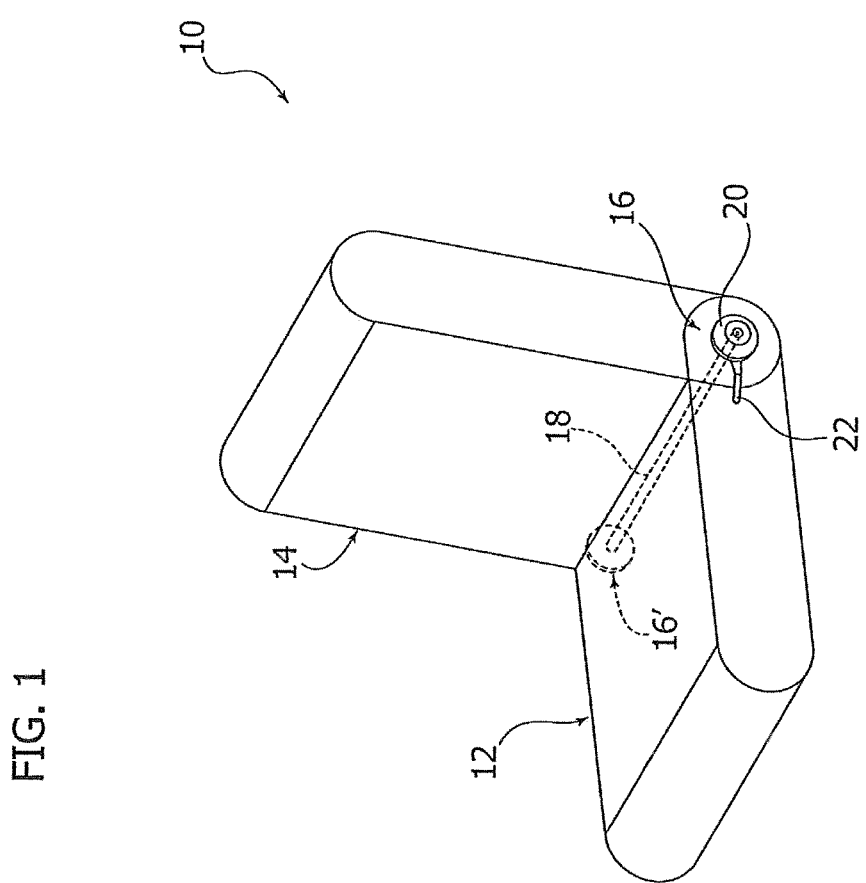
FIG. 1 is a schematic perspective view illustrating a vehicle seat provided with an adjustment device according to a first embodiment of the present invention.

In FIG. 1 there is schematically indicated with 10 a seat for a vehicle comprising a seat portion 12 and a backrest 14. The seat 10 includes an adjustment device 16 for adjusting the inclination of the backrest 14 with respect to the seat portion 12. Generally, the seat 10 comprises two adjustment devices 16, 16' located on two opposite sides of the seat 10 and connected together by a transverse transmission 18.

One of the two adjustment devices 16 comprises a knob 20 for fine adjustment and a release element in the form of a release lever 22 for quick adjustment. The adjustment device 16' located on the other side of the seat 10 has no control elements and is actuated by the first adjustment device 16 through the transverse transmission 18.

Figure 2:
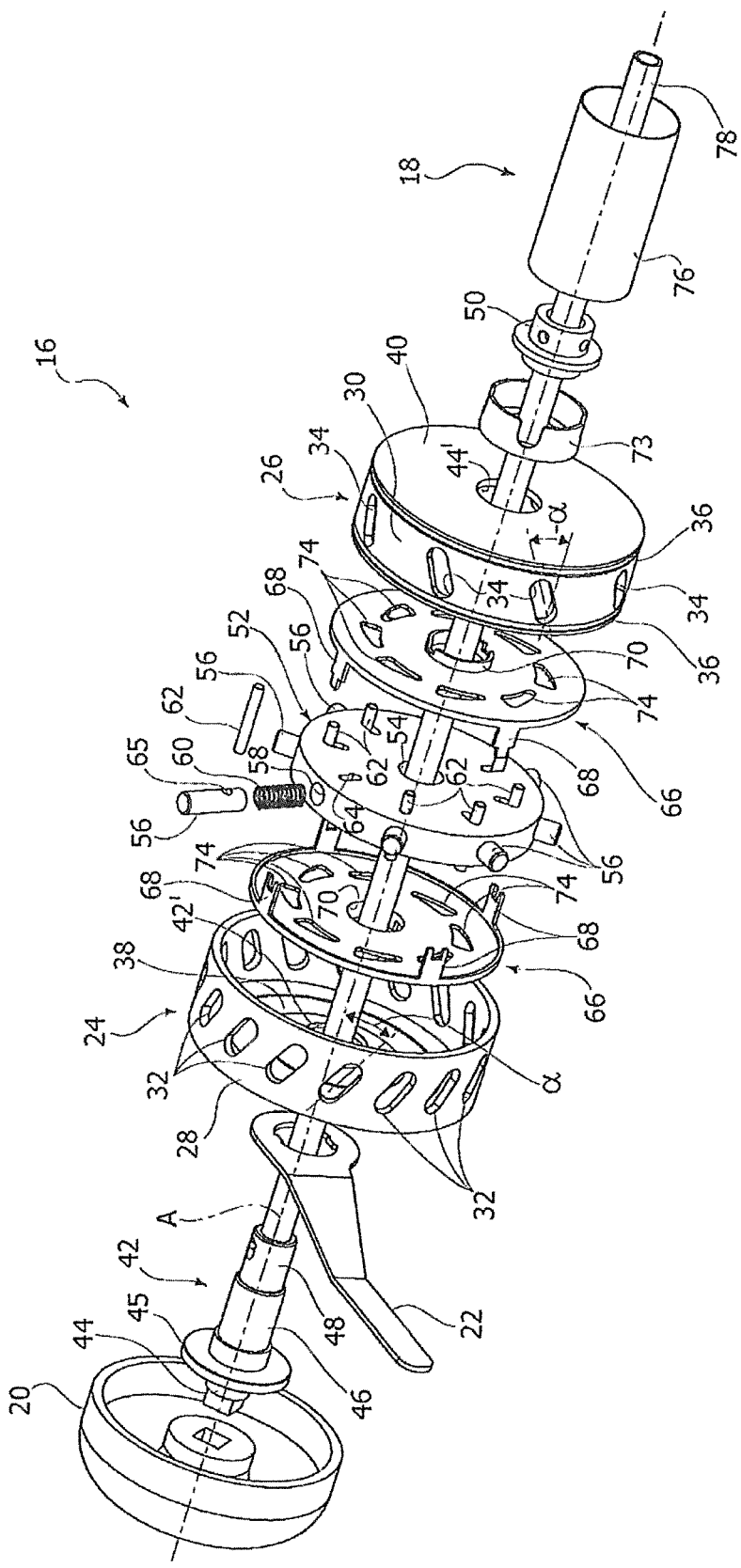
FIG. 2 is an exploded perspective view of an adjustment device according to the first embodiment of the present invention.

With reference to FIG. 2, the adjustment device 16 comprises a first adjustment element 24 and a second adjustment element 26, rotatable relative to each other about a longitudinal axis A. The two adjustment elements 24, 26 are intended to be fixed one to the fixed structure of the seat 10 and the other to the backrest 14. It does not matter which one of the two adjustment elements 24, 26 is fixed to the fixed structure or to the backrest. As will become clearer later, the two adjustment elements 24, 26 are constrained so as to be maintained at a mutual fixed distance in the direction of the longitudinal axis A. In other words, the two adjustment elements 24, 26 are fixed to each other in the direction of the axis A.

The adjustment elements 24, 26 have respective cylindrical walls 28, 30 overlapping each other and coaxial to the longitudinal axis A. The cylindrical wall 30 of the second adjustment element 26 is arranged inside the cylindrical wall 28 of the first adjustment element 24. The two adjustment elements 24, 26 have respective front walls 38, 40 having respective through holes 42', 44' coaxial to the longitudinal axis A. The first adjustment element 24 on its cylindrical wall 28 is provided with a first array of slots 32. The second adjustment element 26 on its cylindrical wall 30 is provided with a second array of slots 34. The slots of the second array of slots 34 of the second adjustment element 26 are made as through holes. The slots of the first array of slots 32 of the first adjustment element 24 can be made as through holes, as illustrated in the Figures, or may be closed on the outer surface of the cylindrical wall 28. The slots of the first array of slots 32 are elongated along respective parallel axes, inclined at a first angle $\alpha$ with respect to the longitudinal axis A.

The slots of the second array of slots 34 are elongated along respective longitudinal axes parallel to each other, inclined at a second angle $-\alpha$ relative to the longitudinal axis A.

Preferably, the angles $\alpha$ and $-\alpha$ are equal and opposite to each other. Therefore, the slots of the first and second arrays of slots 32, 34 are inclined relative to each other at an angle equal to $2\alpha$.

The slots of the second array of slots 34 are preferably provided in a number greater than those of the first array of slots 32. The number of slots of the first array of slots 32 is an integer multiple of the number of slots of the second array of slots 34.

The second adjustment element 26 may be provided with two annular grooves on the outer surface of the cylindrical wall 30 in which two O-rings 36 may be accommodated resting on the inner surface of the cylindrical wall 28 of the first adjustment element 24. If present, the O-rings 36 do not prevent the relative rotation between the two adjustment elements 24, 26 and only serve to dampen 10 vibrations between the two adjustment elements 24, 26.

The adjustment device 16 comprises a control pin 42 rotatable about the longitudinal axis A. The control pin 42 has a head portion 44 to which the knob 20 is fixed. The control pin 42 also has a collar 45, a threaded adjustment portion 46 and a fastening portion 48 which is distal with respect to the head portion 44. The portion of the threaded adjustment portion 46 extends between the front walls 38, 40 of the adjustment elements 24, 26. The fastening portion 48 projects beyond the front wall 40 of the second adjustment element 26 and is fixed to a ring nut 50. The adjustment elements 24, 26 are arranged in the axial direction between the collar 45 of the head portion 44 and the ring nut 50. Thus, the adjustment elements 24, 26 and the control pin 42 are in an axially fixed position relative to one another. The axial constraint does not prevent the relative rotary movement, whereby the control pin 42, the first adjustment element 24 and the second adjustment element 26 are rotatable with respect to one another around the longitudinal axis A. The adjustment device 16 comprises a central body 52 arranged between the first adjustment element 24 and the second adjustment element 26. The central body 52 has a threaded central hole 54 in which the threaded adjustment portion 46 of the control pin 42 is screwed.

The central body 52 carries a plurality of radial pins 56 which are movable in a radial direction within respective radial holes 58 of the central body 52. The radial pins 56 are movable in a radial direction relative to the central body 52 between an extracted position and a retracted position. Elastic means 60, such as helical compression springs, are arranged between the radial pins 56 and the central body 52 and tend to elastically push the radial pins 56 towards the extracted position. Each radial pin 56 is engaged by a respective axial pin 62 which extends within a respective axial through slot 64 of the central body 52, said through slots being elongated in the radial direction. The ends of the axial pins 62 protrude from opposite sides of the central body 52.

The axial pins 62 engage respective transverse holes 65 of radial pins 56. The axial pins 62 are movable in radial direction in the respective through slot 64 together with the radial pins 56. The radial pins 56 are equal in number to the number of slots of the second array of slots 34 of the second adjustment element 26. Each radial pin 56 in the extracted position engages a second slot 34 of the second adjustment element 26 and a first slot 32 of the first adjustment element 24. In the retracted position each radial pin 56 engages only a respective second slot 34 of the second adjustment element 26 and is disengaged from the first array of slots 32 of the first adjustment element 24.

The adjustment device 16 comprises two disengagement elements 66 situated on opposite sides of the central body 52. Each disengagement element has substantially a disk shape perpendicular to the axis A. The two disengagement elements 66 are fixed to each other by means of a plurality of axial arms 68 located along the outer edges of the respective disengagement element 66. The arms 68 of a disengagement element 66 engage with the corresponding arms 68 of the other disengagement element 66 in a position radially external with respect to the central body 52. The arms 68 of the two disengagement elements 66 extend between the radial pins 56 of the central body 52 so as not to interfere with the radial pins 56. The disengagement element 66 are rotatable about axis A independently of the central body 52 and of the adjustment elements 24, 26.

Each of the two disengagement elements 66 has a respective flange 70 which protrudes outside of the respective adjustment elements 24, 26 through the respective hole 44 of the front walls 38, 40 of the respective adjustment elements 24, 26. The flange 70 of the disengagement element 66 located on the side of the first adjustment element 24 is fixed to the lever 22. The flange 70 of the disengagement element 66 located on the side of the second adjustment element 26 is fixed to a bushing 73. Each disengagement element 66 has a front wall in which there are formed a plurality of cams 74 constituted, for example, by through openings with substantially triangular shape. The cams 74 of the two disengagement elements 66 engage the end regions of the respective axial pins 62 that protrude from opposite sides of the central body 52.

Each cam 74 of each disengagement element 66 engages an end portion of a respective axial pin 62. An angular movement of the disengagement elements 66 with respect to the central body 52 around the longitudinal axis A, which movement is manually commanded by means of the lever 22, controls by means of the cams 74 and the axial pins 62 a movement of the radial pins 56 from the extracted position towards the retracted position. When the action on the lever 22 ceases, the radial pins 56 return to the extracted position pushed by the elastic means 60.

The return of the radial pins 56 to the extracted position pulls back the disengagement members 66 and the lever 22 to the original position.

The transverse transmission 18 which connects together the two transmission devices 16, 16' located on the opposite sides of the seat 10 comprises an outer tubular shaft 76 fixed to the bushing 73 and an inner tubular shaft 78 fixed to the control pin 42. The tubular shafts 76,78 are coaxial to the longitudinal axis A. The inner tubular shaft 78 extends with a clearance through the central body 52, the disengagement elements 66 and the adjustment elements 24, 26.

The operation of the first embodiment of the adjustment device 16 is as follows. When the release lever 22 is in the rest position, the radial pins 56 are in the extracted position. Each radial pin 56 engages a second slot 34 of the second adjustment element 26 and a first slot 32 of the first adjustment element 24. In this condition the first and the second adjustment elements 24, 26 are in a fixed angular position corresponding to a certain inclination angle of the backrest 14.

Starting from this configuration, a rotation of the knob 20 around the axis A controls the rotation of the control pin 42 about the longitudinal axis A. The threaded engagement between the threaded adjustment portion 46 of the control pin 42 and the threaded central hole 54 of the central body 52 causes the rotation of the control pin 42 around the longitudinal axis A to command a translation of the central body 52 in the straight direction of the longitudinal axis A. The axial movement of the central body 52 controls a relative rotation between the first adjustment element 24 and the second adjustment element 26 due to the fact that each of the radial pins 56 simultaneously engages two corresponding slots of the array of slots 32, 34 inclined relative to each other. Therefore, by means of the knob 20 the user can control a fine adjustment of the inclination angle of the backrest 14. The rotational movement of the control pin 42 of the first adjustment device 16 is transferred to the second adjustment device 16' located on the opposite side of the seat 10 through the inner tubular shaft 78 of the transverse transmission 18.

Therefore, the two adjustment devices 16, 16' on opposite sides of the seat 10 are simultaneously controlled by the same knob 20. To make a rapid adjustment of large amplitude to the inclination of the backrest 14, the user operates the release lever 22.

The oscillation of the lever 22 around the axis A controls the movement of the radial pins 56 from the extracted position towards the retracted position. The section in FIG. 3 shows the adjustment device 16 in the unlocked position, in which the radial pins 56 are in the retracted position. In the retracted position the radial pins 56 are disengaged from the first array of slots 32 of the first adjustment element 24. Therefore, the first adjustment element 24 is free to rotate about the longitudinal axis A.

The user can vary at will the angle of inclination of the backrest and block the backrest 14 in the desired position by releasing the release lever 22. In fact, the release of the lever 22 brings back the radial pins 56 to the extracted position in which they engage the first array of slots 32 in the new adjustment position. The movement of the release lever 22 is transmitted from the first adjustment device 16 to the second adjustment device 16' through the outer tubular shaft 76 of the transverse transmission 18.

In FIGS. 4-7 a second embodiment of an adjustment device according to the present invention is illustrated.

The elements corresponding to those previously described are indicated with the same numerical references. With reference to FIG. 4, the adjustment device 16 of this second embodiment comprises a single control element consisting of a lever 20 which controls both the fine adjustment and the quick adjustment in the manner described hereafter. The release lever 22 of the previous embodiment is not provided.

Figure 5:
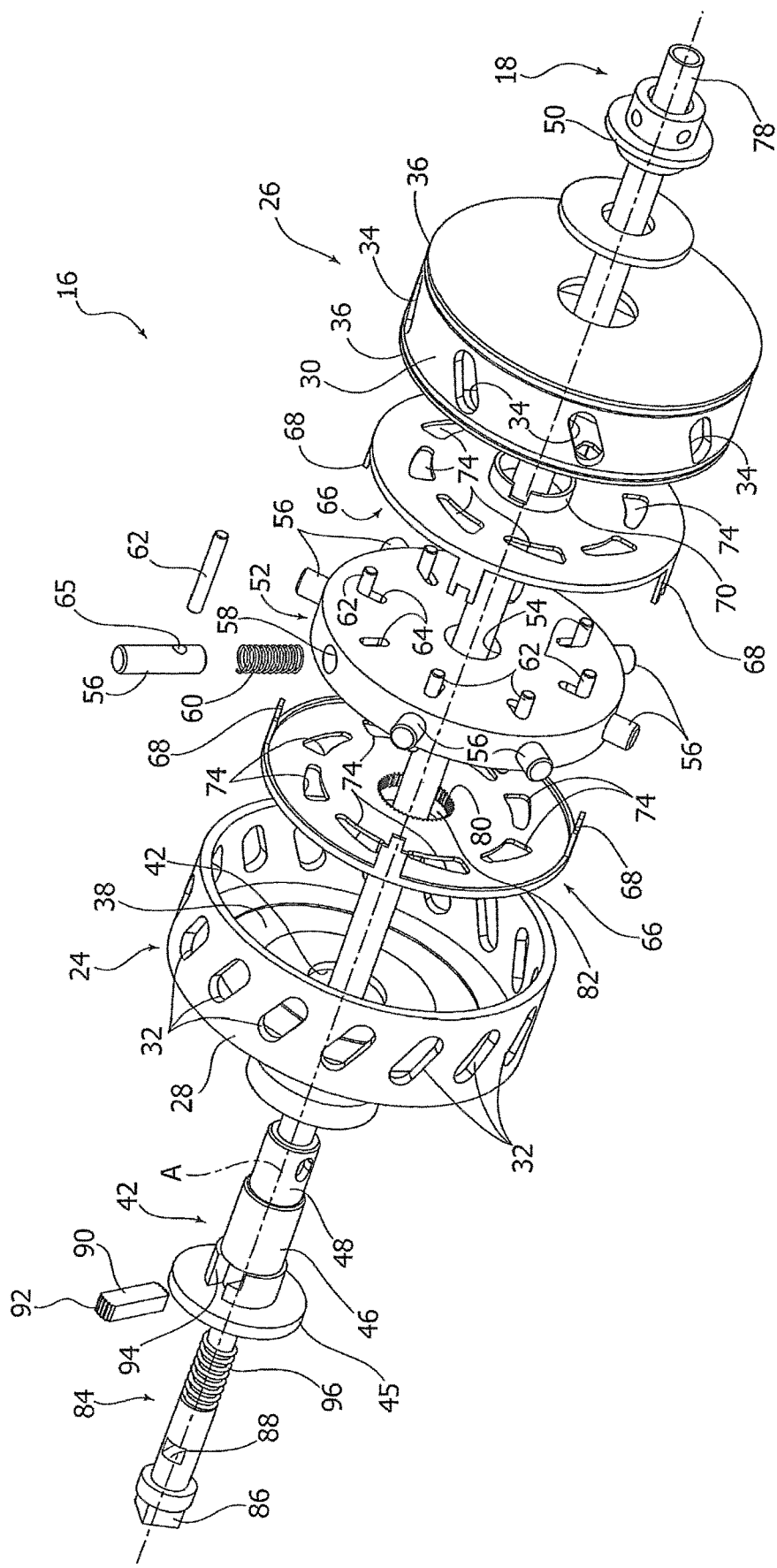
FIG. 5 is an exploded perspective view of the second embodiment of the adjustment device according to the invention.

With reference to FIG. 5, the mechanism of the adjustment device 16 has remained substantially unchanged with respect to the previously described embodiment. Also in this case a first and a second adjustment elements 24, 26, a central body 52 provided with radial pins 56 and two disengagement elements 66 are provided, just as in the previously described case.

The only differences with respect to the previously described embodiment relate to the control pin 42. In this second embodiment, the disengagement element 66 located on the side of the first adjustment element 24 has a flange 70 having an inner surface with a toothed portion 80 and a smooth portion 82. The smooth portion 82 is on the outer side of the flange 70 and the toothed portion 80 is on the inner side of the flange 70.

With reference to FIG. 5, the control pin 42 has a threaded adjustment portion 46 which engages a threaded central hole 54 of the central body 52 and a fastening portion 48 which is fixed to a ring nut 50, as in the previously described embodiment.

In this second embodiment, the release element which controls the angular movement of the disengagement element 66 is constituted by an unlocking pin 84 axially movable with respect to the control pin 42. The unlocking pin 84 has a head 86 to which the knob 20 is fixed. The unlocking pin 84 has a transverse hole 88 in which there is inserted and fixed a key 90 having toothed ends 92 which are intended to engage the toothed portion 80 of the flange 70 of the disengagement element 66. The key 90 of the unlocking pin 84 engages a L-shaped slot 94 of the control pin 42. The L-shaped slot 94 has a narrow portion having the same width as the key 90 and a wide portion having a width greater than the width of the key 90. An elastic means 96, constituted for example by a compressed helical spring, is arranged between the control pin 42 and the unlocking pin 84 and tends to push the unlocking pin 84 to the outside.

Figure 6:
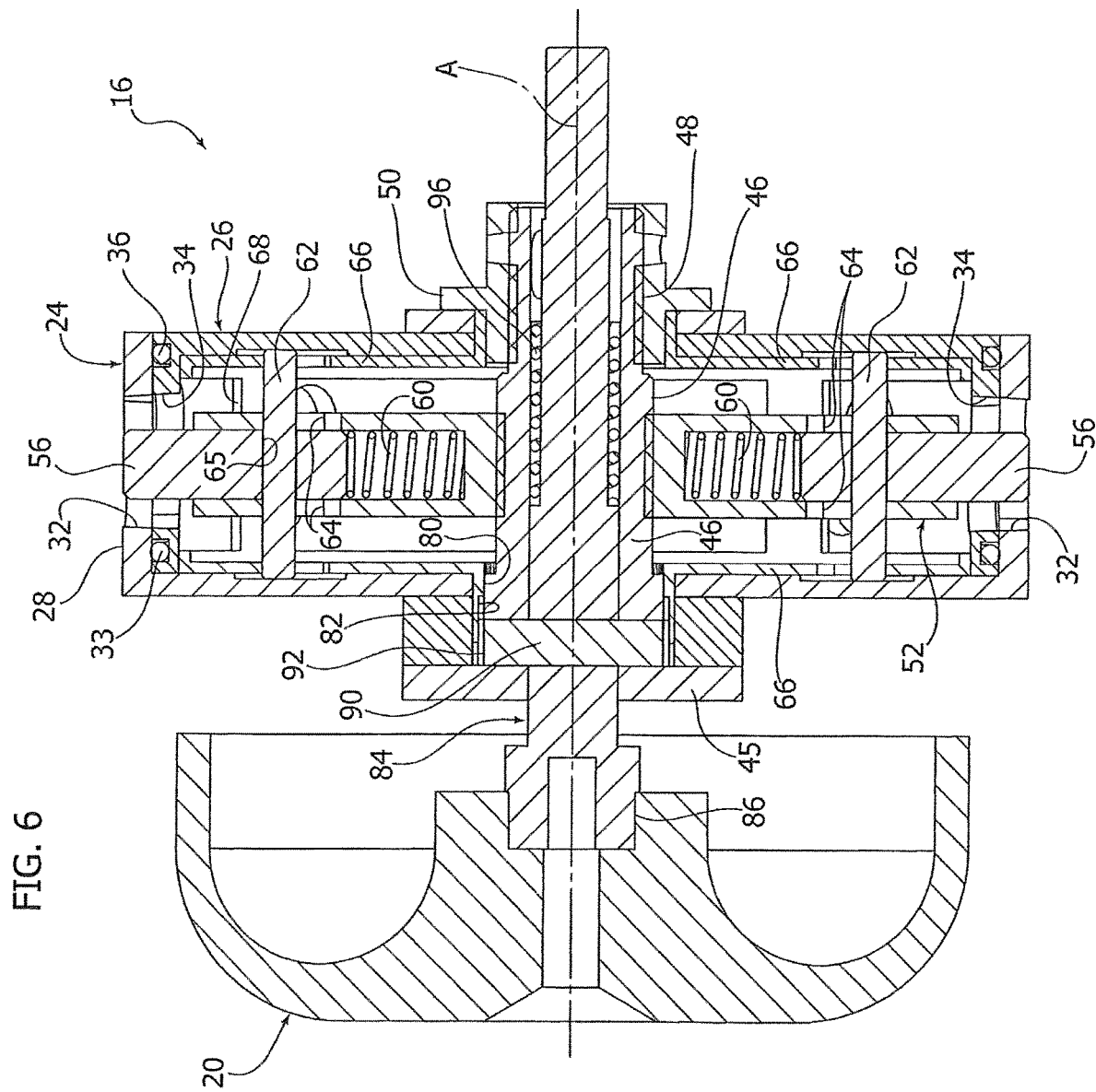
FIGS. 6 and 7 are axial sections of the device of FIG. 5, in the fine adjustment position and in the quick adjustment position, respectively.
Figure 7:
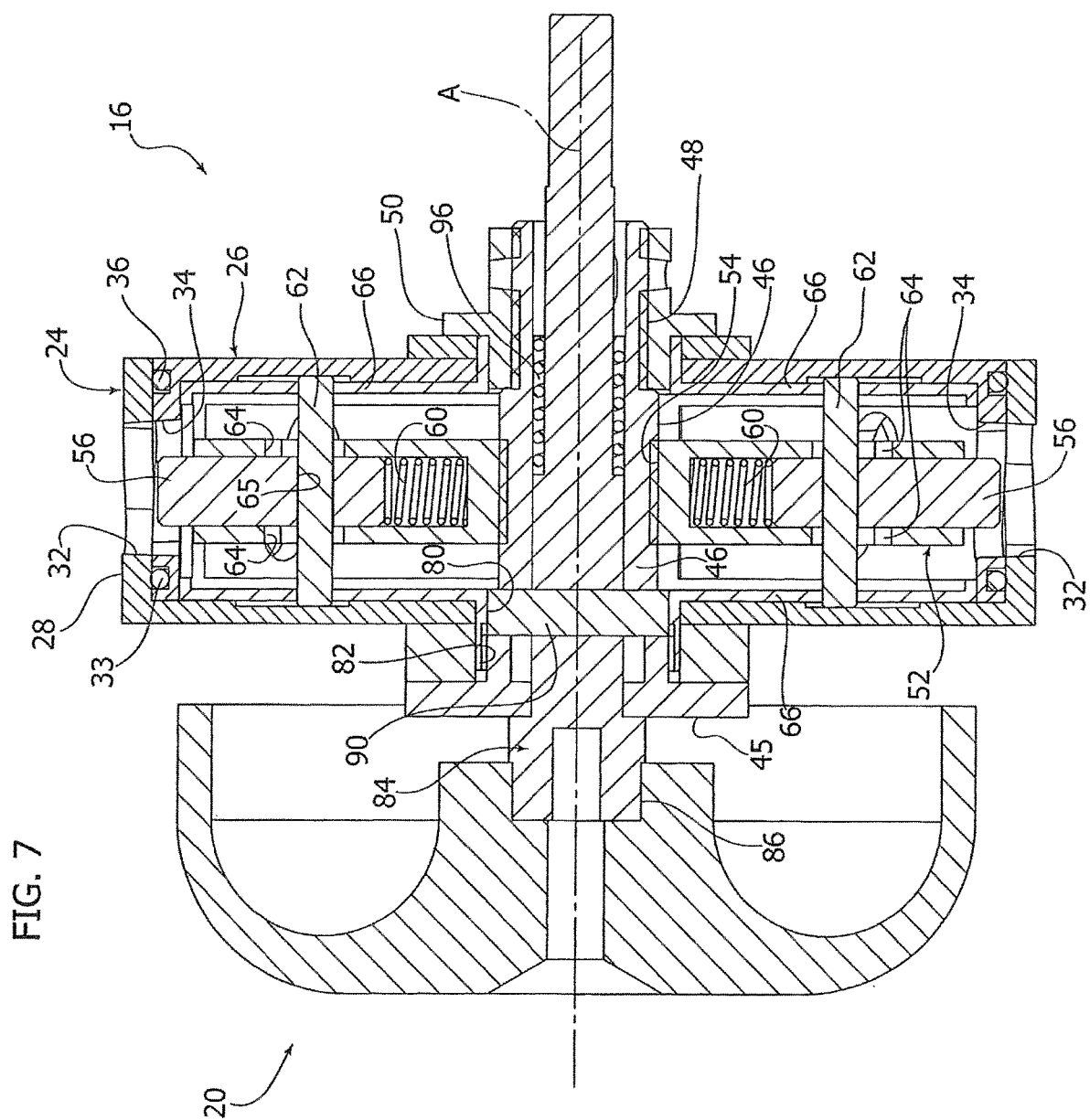

In the rest position the key 90 engages the narrow portion of the L-shaped slot 94. In this position the toothed ends 92 are facing the smooth portion 82 of the flange 70 of the disengagement element 66. This configuration is illustrated in the section of FIG. 6. In this condition, a rotation of the knob 20 controls the rotation of the control pin 42 around the longitudinal axis A since the unlocking pin 84 is rotationally fixed to the control pin 42 by the key 90, which engages the narrow portion of the L-shaped slot 94. The rotation of the control pin 42 controls the fine adjustment of the backrest in a manner identical to the previously described embodiment. To control the rapid adjustment, the user pushes the knob 20 towards the seat and imparts a rotation to the knob 20. The axial movement of the knob 20 pushes the unlocking pin 84 inwards with respect to the control pin 42. This axial movement of the unlocking pin 84 brings the key 90 towards the wide portion of the L-shaped slot 94. In this condition the toothed ends 92 of the key 90 engage the toothed portion 80 of the flange 70 of the disengagement element 66. At this point, a rotation of the knob 20 about the longitudinal axis A imparts a rotation to the disengagement element 66 and, since the unlocking pin 84 is rotationally fixed to one of the disengagement element 66 by means of the key 90, also to the toothed ends 92 and the toothed portion 80. The angular movement of the disengagement element 66 controls the movement of the radial pins 56 from the extracted position to the retracted position and the disengagement of the radial pins 56 from the first array of slots 32. This condition is illustrated in the section of FIG. 7. In this condition, the first adjustment element 24 is free to rotate about axis A as in the case described above. When the knob 20 is released the elastic means 60 associated with the radial pins 56 bring back the radial pins 56 into engagement with the first array of slots 32 as in the case described above and the elastic means 96 associated with the unlocking pin 84 brings back the knob 20 to the rest position. Also in this embodiment a transverse transmission 18 can be provided to transmit the movements of the control pin 42 and the disengagement element 66 to corresponding elements of the adjustment device 16' located on the opposite side of the seat 10, as in the previously described case.

In both described embodiments, the knob 20 can be advantageously actuated by an electric motor.

Of course, without prejudice to the principle of the invention, the construction details and the embodiments can be widely varied with respect to what has been described and illustrated without thereby departing from the scope of the invention as defined by the claims that follow. For example, the adjustment device 16 may be provided with only one disengagement element 66, although the solution with two disengagement elements 66 is considered the preferred option because it allows a more balanced movement of the radial pins 56.

The invention claimed is:

1. Adjustment device for adjusting the inclination of the backrest (14) of a seat (10) of a vehicle, comprising:
   a first and a second adjustment element (24, 26), rotatable relative to each other about a longitudinal axis (A) and constrained at a mutual fixed distance in the direction of said longitudinal axis (A), the first and the second adjustment element (24, 26) having respective cylindrical walls (28, 30) overlapping each other and respectively provided with a first array of slots (32) and a second array of slots (34) inclined relative to each other, a control pin (42) rotatable about said longitudinal axis (A) and comprising a threaded adjustment portion (46), and a fastening portion (48), wherein the fastening portion is fixed to a ring nut (50) to constrain the control pin (42) in a fixed axial position with respect to said first and second adjustment elements (24, 26), a central body (52) arranged between said first and second adjustment elements (24, 26) and having a threaded central hole (54) engaged with said threaded adjustment portion (46) of said control pin (42), wherein the central body (52) is movable axially along said longitudinal axis (A) following a rotation of said control pin (42) about the longitudinal axis (A), a plurality of radial pins (56) carried by the central body (52) and radially movable with respect to the central body (52) between an extracted position and a retracted position and cooperating with elastic means (60) which tend to push said radial pins (56) towards said extracted position, wherein in the extracted position each of said radial pins (56) engages a first slot (32) and a second slot (34) of said adjustment elements (24, 26) and in the retracted position said pins (56) are disengaged from the first array of slots (32), at least one disengagement element (66) rotatable about said longitudinal axis (A) independently of said first and second adjustment element (24, 26) and from said central body (52) and having a plurality of cams (74) adapted to control the movement of said radial pins (56) from the extracted position to the retracted position as a result of an angular movement between the disengagement element (66) and the central body (52), and a release element (22, 84) for imparting an angular movement about said longitudinal axis (A) to said disengagement element (66).

2. Adjustment device according to claim 1, wherein said release element comprises a lever (22) directly fixed to said disengagement element (66).

3. Adjustment device according to claim 1, wherein said release element comprises an unlocking pin (84) movable axially with respect to said control pin (42) between a rest position and an engagement position and carrying a key (90) with toothed ends (92) which in the position of engagement of the unlocking pin (84) cooperate with a toothed portion (80) of said disengagement element (66).

4. Adjustment device according to claim 1, wherein each of said radially extending pins (56) is movable in a respective radial hole (58) of said central body (52) and is engaged by a respective axial pin (62) extending through a respective through slot (64) of the central body (52), each axial pin (62) having ends that protrude from opposite sides of said central body (52).

5. Adjustment device according to claim 4, comprising two disengagement elements (66) fixed to each other on opposite sides of said central body (52) and having respective cams (74) which engage said end portions of said axial pins (62).

6. Adjustment device according to claim 1, comprising a cross transmission (18) including an outer tubular shaft (76) fixed to said at least one disengagement element (66) and an inner tubular shaft (78) fixed to said control pin (42).

* * * * *